United States Patent [19]

Takigawa et al.

[11] Patent Number: 5,054,202
[45] Date of Patent: Oct. 8, 1991

[54] PRUNING MACHINE

[75] Inventors: Masuhiko Takigawa; Eiji Tadanobu, both of Osaka, Japan

[73] Assignee: ARS Edge Co., Ltd., Osaka, Japan

[21] Appl. No.: 307,038

[22] Filed: Feb. 7, 1989

[51] Int. Cl.⁵ ............................................. B26B 19/02
[52] U.S. Cl. ........................................ 30/208; 56/237
[58] Field of Search ................... 30/208, 196; 56/233, 56/234, 236, 235, 237

[56] References Cited

U.S. PATENT DOCUMENTS

| 1,868,402 | 7/1932 | Terry | 30/208 |
| 2,468,312 | 4/1949 | Turner | 56/237 X |
| 2,579,862 | 12/1951 | Richardson | 56/237 X |
| 3,435,600 | 4/1969 | Tickle | 56/237 |
| 3,564,713 | 2/1971 | Congdon | 30/208 |
| 3,805,501 | 4/1974 | Cole | 56/237 |

Primary Examiner—Timothy V. Eley
Assistant Examiner—Willmon Fridie, Jr.
Attorney, Agent, or Firm—Armstrong, Nikaido, Marmelstein, Kubovcik & Murray

[57] ABSTRACT

There is disclosed a pruning machine capable of freely changing an angle of a pruning edge unit consisting of movable and fixed edges by forming flexible members between the pruning edge unit and a movable edge operating unit provided in continuation from the rear ends of the movable edges.

6 Claims, 2 Drawing Sheets

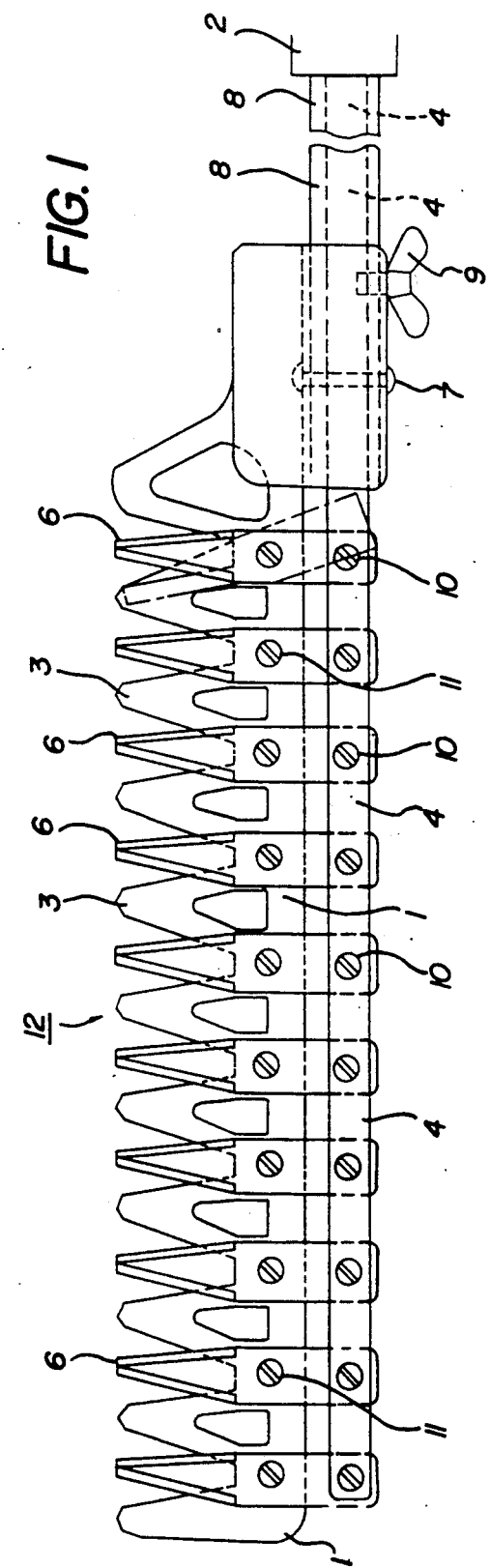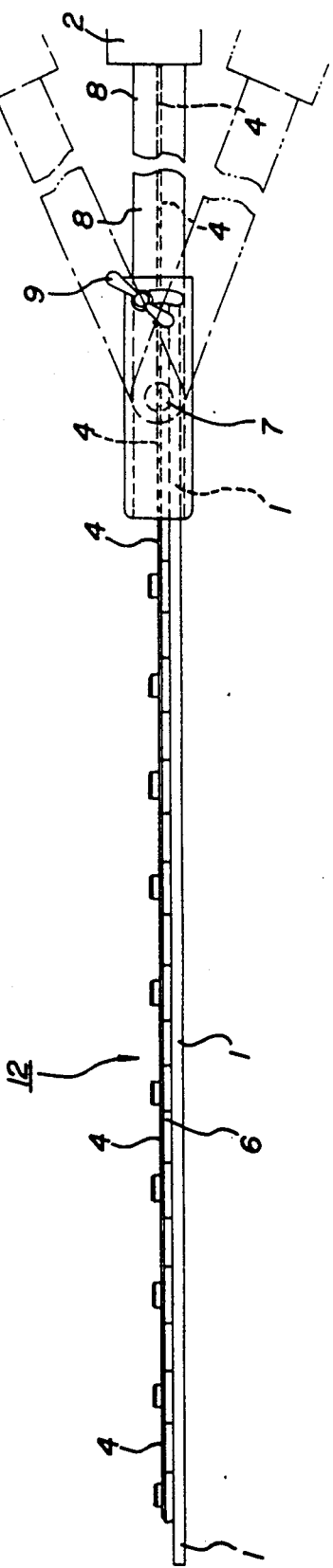

PRUNING MACHINE

BACKGROUND OF THE INVENTION

1. Field of the Invention

The present invention relates to a pruning machine capable of freely changing an angle of a pruning edge unit.

2. Description of the Prior Art

A conventional pruning machine is typically arranged such that non-flexible members are formed between a pruning edge unit composed of movable and fixed edges and an operating unit for the movable edges.

On the occasion of employing the non-flexible members, however, it is impossible to vary an angle of the pruning edge unit. It is therefore required that the angle of the pruning edge unit be changed by raising or lowering the hand which grasps the pruning machine to adapt itself to heights of plants in the garden or of the hedge. Especially when pruning the low garden plants, the gardener has to bend his waist to manipulate the machine. Where the operating unit of the pruning machine incorporates a driving source, in the great majority of cases the driving source is formed with protrusions which interfere with the raising or lowering of hand. In the case of shears suited to prune tall branches, a long handle is provided between the operating unit and the pruning edge unit, with the result that the angle of the pruning edge unit can not be changed simply by raising or lowering the hand. Thus, well-pruned branches are not invariably obtained.

BRIEF SUMMARY OF THE INVENTION

It is a primary object of the present invention to provide a pruning machine capable of freely changing an angle of a pruning edge unit.

BRIEF DESCRIPTION OF THE DRAWINGS

Other objects and advantages of the invention will become more apparent during the following discussion in conjunction with the accompanying drawings, in which:

FIG. 1 is a plan view illustrating a pruning machine according to the present invention;

FIG. 2 is a side view thereof;

DETAILED DESCRIPTION OF THE PREFERRED EMBODIMENTS

Figure 3:
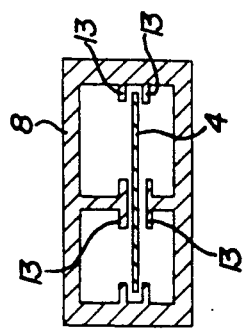
FIG. 3 is a cross-sectional view depicting a pipe in a case where guide members are provided.
Figure 4:
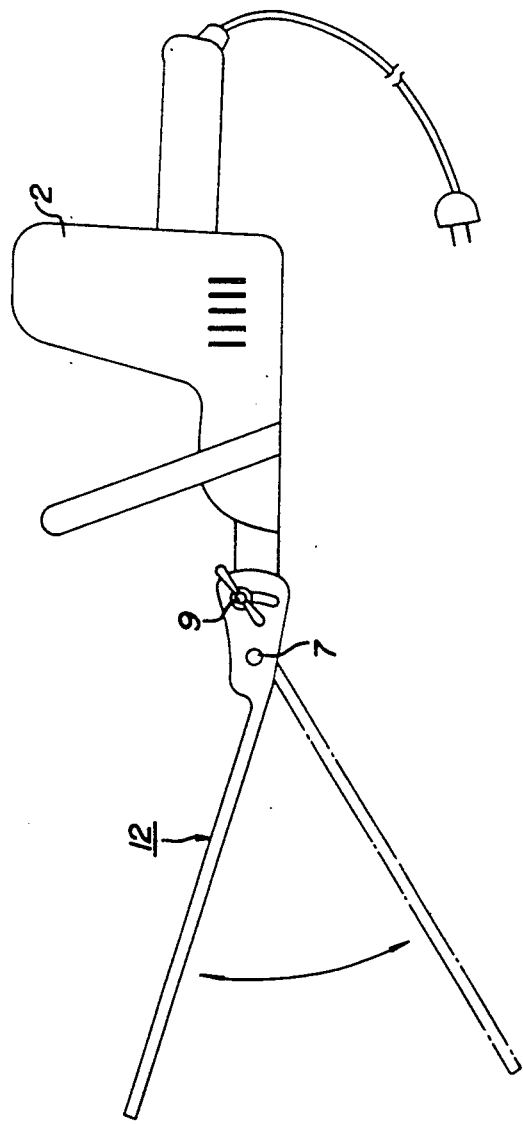
FIG. 4 is an explanatory view showing a handy type pruning machine.

The present invention will hereinafter be described with reference to FIGS. 1 to 4.

A driving source generally designated at 2, which is conventionally incorporated into a conventional hair-clippers type pruning machine driven by a motor, is also used in this embodiment. Fixed to a front portion of driving source 2 is a fixed plate 1, one side surface of which is provided protrusively with a multiplicity of fixed edges 3 at given intervals in a comb-like configuration in the longitudinal direction thereof. A lengthy movable plate 4 is mounted on fixed plate 1 in the longitudinal direction, the rear end of which is connected to driving source 2. Movable plate 4 makes reciprocations by turning ON a switch of driving source 2. Movable plate 4 is typically formed of a thin steel plate to exhibit a flexible strength. If a sheet of steel plate is hard to be bent, the movable plate may be composed of thin steel plates laminated on each other to obtain a considerable strength. Excepting the thin steel plates, the material of movable plate 4 includes aluminum, FRP or the like. The materials having the flexible strength can be employed in the present invention. As illustrated in the Figure, the lengthy movable plate 4 may be formed only of the thin steel plates. However, part of the movable plate may be composed of the thin steel plates, and remaining portion thereof may be composed of the steel plates each having a medial thickness, in which case connecting portions are fastened with screws or by caulking. The numeral 7 represents an edge fixing screw provided in the vicinity of the top of an angular or round pipe 8 for accomodating and supporting movable plate 4, the fixing screw being defined as a point at which movable plate 4 is bent. If movable plate 4 is formed long, it is likely that a driving force given by driving source 2 is not transferred efficiently due to a flexure of movable plate 4. Such being the case, guide members 13 for lengthy movable plate 4 are formed on an inner wall of pipe 8 are coated with well-slidable resin, thereby obtaining good slidableness between the inner wall of pipe 8 and movable plate 4. The numeral 9 denotes an edge clamping screw provided in rear of edge fixing screw 7. When slackening edge clamping screw 9, pruning edge unit 12 can, as depicted by an imaginary line of FIG. 2, be inclined at a desired angle by a slight force. When intensively fastening the edge clamping screw 9 after changing the angle, pruning edge unit 12 is kept at the desired angle. Interposed between fixed plate 1 and movable plate 4 are hair-clipper type movable edges 6 separated from each other, the movable edges being respectively secured in line to movable plate 4 with screws 10. Screws 11 fitted to individual movable edges 6 each serve as a fulcrum when each movable edge 6 makes a circular arc motion (cutting action).

In the thus constructed pruning machine according to the present invention, the pruning edge unit is bent through a desired angle about a point of the edge fixing screw by slackening edge clamping screw 9. Subsequently, edge clamping screw 9 is fastened, whereby the pruning machine equipped with the pruning edge unit having the desired angle is capable of pruning the garden plants.

As best seen in FIG. 5, the present invention can be applied to a handy type pruning machine including a shortened movable plate 4, the arrangement being such that the angle of pruning edge unit 12 can be varied, with edge fixing screw 7 serving as a fulcrum, by slackening edge clamping screw 9.

If the present invention is applied to shears (not illustrated) suited to shear tall branches which are classified as one of pruning machines, instead of a rod shaped in continuation from the movable edges, a band-like thin steel plate is employed; or alternatively the band-like thin steel plate is used for part of the rod, and the steel plate is connected to the rod with a screw or by caulking.

In accordance with the present invention, the flexible member is interposed between the pruning edge unit and the operating unit, it is therefore feasible to freely change the angle of the pruning edge unit by bending the flexible member. With this arrangement, the operation such as mowing of lawns and pruning of garden plants with a low posture can be effected without bending the waist. Tall branches, which require a high posture, can also readily be pruned.

The pruning machine according to the present invention is capable of freely changing the angle of the pruning edge unit simply by bending the flexible member provided between the pruning edge unit and the operating unit.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A pruning machine, comprising:
   a pruning edge unit composed of movable edges and fixed edges;
   operating means for shifting said movable edges with respect to said fixed edges;
   angle adjusting means for adjusting and controlling the angular position of said pruning edge unit relative to the pruning machine; and
   a flexible member means connected between said movable edges and said operating means, for transmitting movement from said operating means to said movable edges, said flexible member means being able to flex in response to said angle adjusting means while said operating means connected to said flexible member means effects reciprocating movement of said movable edges relative to said fixed edges.

2. The pruning machine of claim 1, wherein said flexible member means comprises a thin steel plate.

3. The pruning machine of claim 1, wherein said angle adjusting means comprises an edge fixing screw and an edge clamping screw.

4. The pruning machine of claim 1, wherein said operating means comprises a motor for driving said flexible member means.

5. The pruning machine of claim 1, further comprising:
   a guide means, having guide members that contact said flexible member means, for guiding said flexible member means between said guide members, such that driving force provided by said operating means is transferred efficiently to said flexible member means during flexure of said flexible member means.

6. The pruning machine of claim 4, wherein said guide members are coated with well-slidable resin.

* * * * *